Patented Dec. 20, 1932

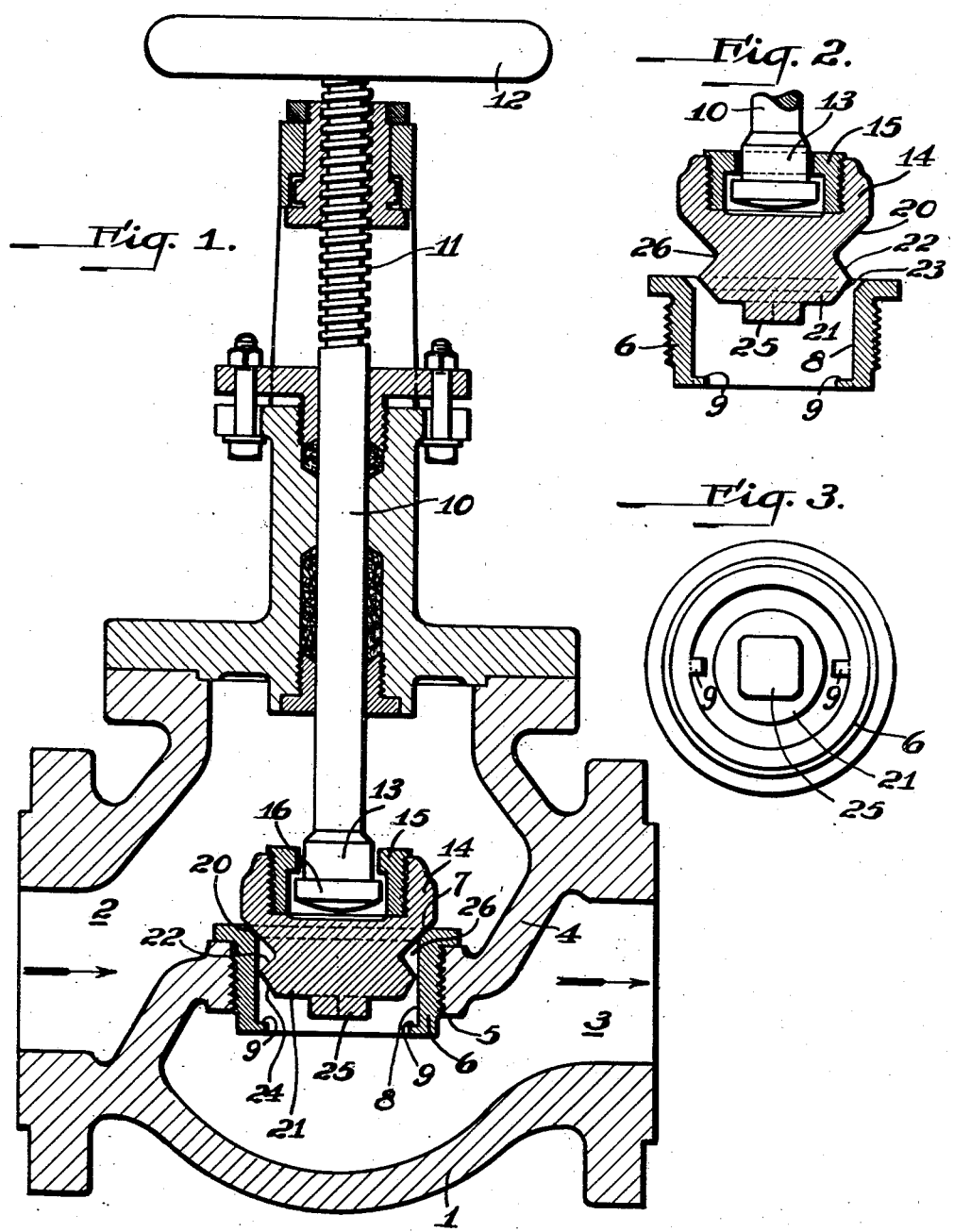

1,891,374

UNITED STATES PATENT OFFICE

WILLIAM EHEMANN, OF ALIQUIPPA, PENNSYLVANIA

VALVE

Application filed May 2, 1930. Serial No. 449,174.

This invention relates to valves, and more particularly to means for preventing the wire-drawing of valves for high pressure fluid control. It is an improvement on the oscillating valve structure described in prior Patent No. 1,437,750, issued December 5, 1922, to this inventor and another.

The chief object of the invention is to provide such a valve so constructed that the fluid flow will be obstructed and reduced in velocity at that critical point of the opening or closing of the valve when it is just barely out of contact with its seat. This object is accomplished by providing a loose mounting for the valve member on its carrying stem, so that the valve member when cracked will be free to oscillate slightly, and further providing means for breaking up and obstructing the flow of the fluid between the valve member and its seat, whereby to reduce velocity of flow and cause the valve member to vibrate or oscillate on its seat at the moment of cracking.

It is well known in the art that wire-drawing of valves and valve seats is likely to be caused by passage of fluid under great pressure between a valve member and seat when the two are just barely out of contact, either in opening or closing, or when the valve seating surfaces are not accurate, or have been worn or damaged. Normally, after a valve is entirely closed, or after it has been opened any substantial distance, there is no danger of wire-drawing. But when wire-drawing once starts, it may produce a slight irregularity between the valve member and its seat, and thereafter even when the valve member is closed as far as it can go, a slight leakage may result, and the fluid passing therethrough under high pressure may cut out the valve member or the seat, and eventually destroy the closure. It is to reduce the liability of such leakage and such destruction of valve member and seats that the present invention is directed.

Referring to the drawing, Fig. 1 is a central vertical section showing a valve mechanism comprising my improvement, the valve member being in closed position; Fig. 2 is a partial section similar to that of Fig. 1, showing the valve member in open position; and Fig. 3 is an under-plan view of the valve member and its seat.

It will be understood that the invention is applicable to valves of many types, but for convenience it is here illustrated as applied to an ordinary Jenkins type globe valve, the general construction of which is well known, and need not therefore be detailed. Such valves comprise a casing 1, having an inlet chamber 2 and an outlet chamber 3, with a diaphragm 4 separating them. In the middle portion of this diaphragm a bore is provided having a threaded wall 5, adapted to receive a cooperatively threaded seat member 6, having a preferably tapered valve seat 7 ground therein, with a cylindrical bored portion 8 therebelow. Lugs 9 are provided for engagement of a wrench. A valve stem 10 having a threaded portion 11 and a hand wheel 12 carries a head member 13.

The valve member itself is formed of a main body member 14, having a threaded bore adapted to engage a threaded cap member 15, which surrounds the head 13 of the stem, and encloses a collar 16 on the head. The cap member 15 has a bore surrounding the collar 16, which is freely carried therein, allowing for relative movement between the said collar and cap, so that the valve member is loosely mounted on its stem by this connection, capable of being oscillated or vibrated with respect to the stem.

The valve member has preferably a tapered seating portion 20, adapted to coperate with the tapered seat face 7, above referred to. The conical faced seating portion 20 of the valve member extends downward a material distance below where this face normally contacts with the cooperating face 7 of the seat and carries an extension 21. This extension comprises an outwardly flaring conical portion 22 with a periphery 23 which is only slightly less in diameter than that of the cylindrical bore 8 of the seating member. The valve extension 21 then has an inwardly tapered conical portion 24, the faces 22 and 24 forming a substantial knife edge periphery 23 of the extension portion. The lower portion of the valve member extension 21 carries a non-circular head 25, suitable for engagement by a wrench. The two conical faces 22 and 24 provide an annular triangular notch 26 around the valve body between the head portion 14 and the extension 21, beneath the portion 20 of the valve that contacts with its seat 7.

The operation of the valve is as follows: Fig. 1 shows the valve in closed position. The tapered ground faces 20 of the valve member, and 7 of the valve seat, normally fit accurately together, completely closing off the passage of fluid from chamber 2 to chamber 3. The pressure is such as to aid in closing the valve, and if the grinding is accurate and the valve member and its seat uninjured, no fluid can pass through when the valve member is seated. When the valve member is to be opened the hand wheel 12 is actuated, the collar 16 engages the cap 15, and the valve is moved upward. As soon as it is lifted from its seat, or cracked, a rush of fluid occurs downward between the valve member and seat. This is a critical moment when injury is likely to occur. With the construction shown, the entire valve being free to oscillate on its carrying head 16, the fluid under great velocity passing between the faces 7 and 20 into the enlarged annular space 26, is caused to burble and swirl in that space. That is to say, complex cross currents are set up in the fluid, much like those that occur in a Maxim silencer or a muffler, and these cross currents and counter currents obstruct the flow of fluid through that space, so that its velocity is greatly reduced before it passes out between the edge 23 and the wall of the bore 8. Furthermore, this burbling or breaking up of the current in the chamber 26 causes the valve head 14 to vibrate or oscillate on the seat. That is freely permitted by the loose mounting on the stem. This vibration further reduces velocity as well as preventing the flow from being concentrated in any particular path. All of which tends to prevent wire-drawing.

The oscillation of the valve member is not great enough to cause chattering, or any serious structural strains, since the edge 23 of the depending portion of the valve member is closely guided in the bore 8, and nothing more than minor oscillations or vibrations are possible. These are, however, effective for the purposes described.

The closeness of the contact of the edge 23 with the bore 8 may be selected according to the density of fluid to be controlled, and the pressures to which the valves are to be exposed. With high pressure steam it is desirable to have substantially a knife-edge formed between the faces 22 and 24, and to have this edge close fitting in the bore 8. With liquids, and lower pressures, the knife-edge may be replaced by a slightly rounded junction of the faces 22 and 24, and the clearance between this periphery and its enclosing bore, may be made greater, according to the viscosity or density of the liquid being controlled.

Fig. 2 shows the valve in open position. From the time the valve is cracked until it reaches full open position the depending portion or extension 21 of the valve member traveling in the bore 8 causes the breaking up of the fluid flow, and the constant oscillation or vibration of the valve member with reference to its seat, as described, until after the valve member has been raised beyond all danger of wire-drawing. Likewise in closing, the extension 21 will pass below the seating face 7 of the seat member 6 before there is any possibility of wire-drawing. Thereafter the valve member will be caused to oscillate or vibrate as the portion 21 descends in the bore 8, and this vibration or oscillation will continue until the valve member is seated.

As soon as the portion 21 descends into the bore 8, the flow of fluid will be substantially cut off, but the valve member will travel a material distance thereafter, before contact with its seat, and during this travel the velocity of flow of fluid will be restricted and broken up by the regurgitation and burbling that will take place in the chamber at 26, formed between the body of the main valve and the extension 17.

Valves of this type will last much longer than the ordinary fixed disc type, and they add greatly to the efficiency and economy of high pressure control valve mechanisms. If and when they become damaged, the valves and/or the seats may be readily removed and replaced without destroying the valve mechanism as a whole, and the structure is obviously strong, simple, and effective.

I claim:

A valve mechanism comprising a casing, a diaphragm therein having a port therethrough, a valve seat comprising a cylindrical bore about the port, a valve member having a tapered seating portion adapted to cooperate with the seat to close the port, a stem carrying and controlling the valve member, the valve member being loosely mounted on the stem to allow the valve to oscillate when not in complete contact with the seat, and a depending extension beneath the seating portion of the valve adapted to fit closely but movably in the cylindrical bore of the seat member and having an annular angular channel just beneath the seating portion of the valve member formed by a knife-edged enlargement around the extension adapted to fit closely but slidably in the cylindrical bore when the valve member is on or near its seat.

In testimony whereof, I sign my name.

WILLIAM EHEMANN.